Sept. 26, 1967   E. L. MARTIN ET AL   3,343,581
CAPTIVE SCREW FASTENER
Filed July 1, 1966   2 Sheets-Sheet 1
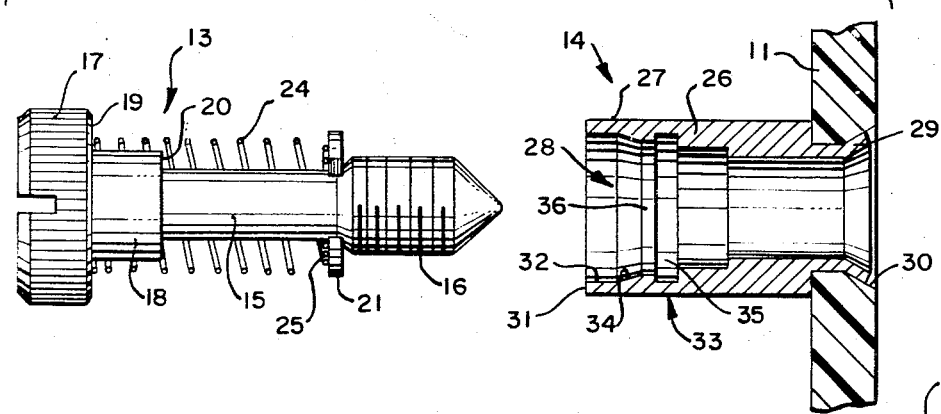
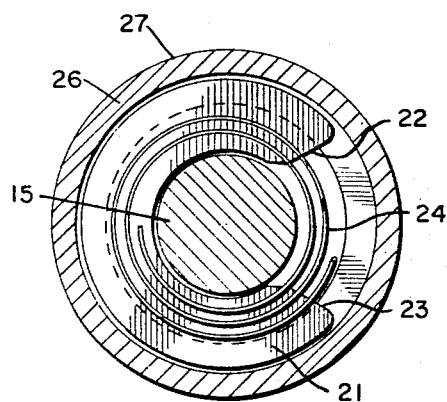
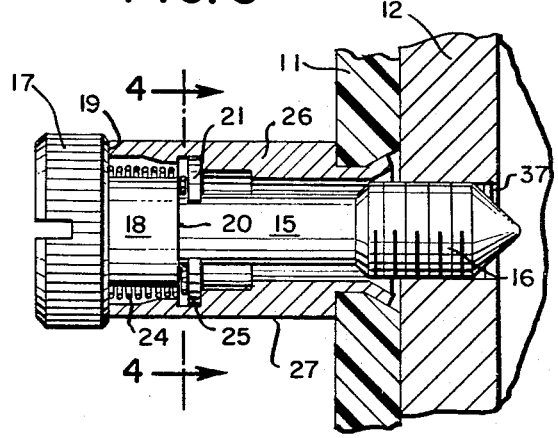
INVENTORS
ELMER L. MARTIN
JOHN J. MacLYMAN
CLIFFORD L. KELSEY Sept. 26, 1967   E. L. MARTIN ET AL   3,343,581
CAPTIVE SCREW FASTENER
Filed July 1, 1966   2 Sheets-Sheet 2

INVENTORS
ELMER L. MARTIN
JOHN J. MAC LYMAN
CLIFFORD L. KELSEY

United States Patent Office 3,343,581
Patented Sept. 26, 1967

3,343,581
CAPTIVE SCREW FASTENER
Elmer L. Martin, Gardena, John J. MacLyman, Lawndale, and Clifford L. Kelsey, Los Angeles, Calif., assignors to Northrop Corporation, Beverly Hills, Calif., a corporation of California
Filed July 1, 1966, Ser. No. 565,040
4 Claims. (Cl. 151—69)

This is a continuation-in-part of our earlier filed co-pending application, Ser. No. 364,622, filed May 4, 1964, now abandoned.

This invention relates to a captive screw fastener and more particularly to such a device which is retained in a closure and is suitable for rapid attachment and detachment of such closure and its associated container.

Captive screw fasteners wherein a fastening screw member is permanently held to a closure such as a panel are utilized widely to enable the rapid fastening and unfastening of closure members and their associated containers. In such devices of the prior art, the screw member is generally retained with a receptacle member by means of an elastic O ring or deformable bushing. Such bushings after a relatively short period of time become worn by galling, enlarged and often rupture, necessitating frequent replacement thereof.

In a co-pending patent application, now U.S. Patent No. 3,250,559 entitled "Captive Screw" issued in the name of Charles C. Sommerfeld and assigned to Northrop Corporation, a captive screw device which utilizes wear resistant retainer means for captivating the fastening screw is described. The device described in the aforementioned patent application overcomes the shortcomings of prior art devices in providing durable retainer means for the screw. In the device described in the aforementioned patent, it is necessary in achieving the captivation of the retainer in the receptacle assembly, that the outside diameter of the retainer ring be slightly larger than the inside diameter of the associated receptacle to assure a press fit therebetween. This necessitates the stocking of separate receptacle members for each size screw fastener. The device of this invention provides an improvement over the devices described in the aforementioned patent application in which close tolerances between the outside diameter of the retainer ring and the inside diameter of the receptacle is no longer necessary, thereby enabling the use of a single size receptacle with retainer rings having a reasonable variation in outside diameter. In addition, the fabrication of the screw with the retainer and the assembly of the screw with its associated receptacle is greatly facilitated.

The invention is in a captive screw fastener for fastening a closure to a container and includes an elongated screw member having a centrally located shank portion with a threaded end portion on one end of the screw member of a larger diameter than the shank for threading into a container, a head portion on the end of the shank opposite to the threaded end portion and having a larger diameter than the shank portion to define a first annular smaller diameter than the head portion but of larger diameter than the shank porion to define a first annular shoulder between the head portion and the intermediate portion and a second annular shoulder between the intermediate portion and the shank. A resilient split ring retainer member is attached to the shank of the screw member and spring means surrounds the shank and is biased between the retainer member and the first annular shoulder portion. A generally cylindrical receptacle member is provided which has an axial bore extending therethrough with means at one end portion for attachment to a closure and the opposite extended end portion thereof having an inlet opening of a diameter greater than the outer diameter of the split ring in its radially uncompressed condition; an inwardly beveled inner wall surface portion of the cylindrical member converges from a cylindrical portion adjacent the extended end portion of the receptacle which cylindrical portion has a diameter greater than the outside diameter of the ring in its radially uncompressed condition to a diameter less than the outside diameter of the split ring in its uncompressed condition at a center portion of the receptacle. An annular groove of larger diameter than the smallest diameter of the inwardly beveled inner wall terminates this inwardly beveled surface portion at a center portion of the receptacle. Contact means having an axial length exceeding the axial length of the inwardly beveled wall surface portion is provided so that in assembly, the spring member will axially compress and the contact means will positively contact the split ring member to simultaneously axially advance and radially inwardly compress the split ring member as it moves along the inwardly beveled wall surface portion until it is advanced to the center portion of the receptacle where it radially expands into the groove and is held therein against axial displacement.

This contact means can comprise the intermediate portion alone, or with at least one convolution of the spring means positioned between the second annular shoulder and the split retainer member, or the axially compressed spring.

It is therefore an object of this invention to provide an improved captive screw fastener in which the need for maintaining close dimensional tolerances between the screw retainer means and the holding receptacle is eliminated.

It is another object of this invention to provide an improved captive screw device utilizing durable retainer means which is simpler and more economical to fabricate and assemble than similar prior art devices.

Preferred embodiments of the invention are described hereinbelow with reference to the drawing wherein:

FIG. 1 is an elevational view partially in cross section of a first embodiment of the device of the invention prior to assembly;

FIG. 2 is an elevational view partially in cross section of the device of FIG. 1 during assembly;

FIG. 3 is an elevational view of the embodiment of FIG. 1 shown in its assembled position as it is being used to connect a closure to an associated container;

FIG. 4 is a section taken along lines 4—4 of FIG. 3;

Figure 5:
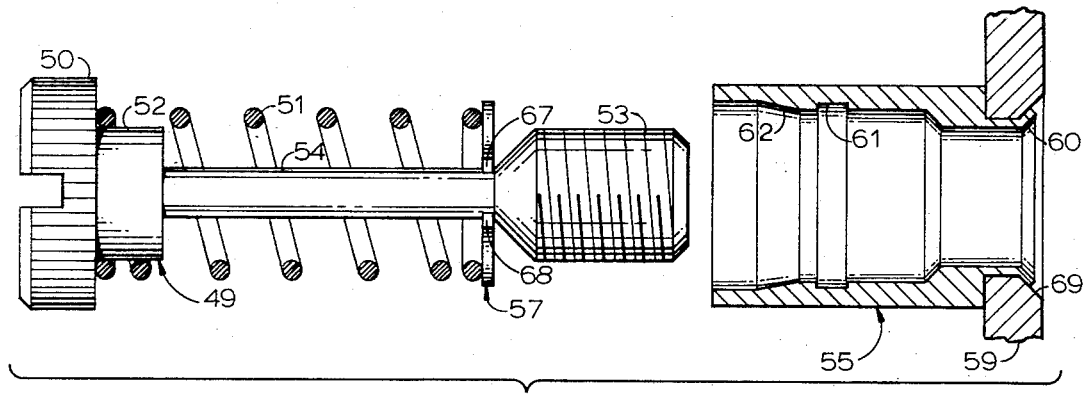
FIG. 5 is an elevational view partially in cross section of a second embodiment of the invention prior to assembly.

Referring to FIGS. 1–4, a first embodiment of a captive screw fastener assembly 10 is shown designed for attachment of a closure 11 to a container wall 12. The assembly is basically comprised of two members; a screw member 13 and a receptacle 14 which is attached to the container wall 11. The elongated screw member 12 has a centrally located shank portion 15 and an enlarged threaded end portion 16 which is of a larger diameter than the shank and is designed to be threaded into the container wall. A knurled head portion 17 is provided on the end of the shank 15 opposite to the threaded end portion 16 and has a larger diameter than the shank. An intermediate portion 18 integral with and extending axially from the head portion 17 is of smaller diameter than the head portion but of larger diameter than the shank 15; the intermediate portion is positioned between the head portion and the shank and defines a first annular shoulder 19 between the head portion and the intermediate portion and a second annular shoulder 20 between the intermediate portion and the shank.

A resilient split ring retainer member 21 is attached to the shank. The retainer member is a split C shaped retainer ring preferably fabricated of a resilient hard metal with converging oppositely facing spaced sides 22 and 23 which define the split in the ring. The space between the outer edges of sides 22 and 23 is preferably greater than the diameter of the shank and inside diameter of tthe retainer is also greater than the diameter of the shank so as to facilitate snapping of the ring onto the shank and permitting radial compression of the ring during assembly.

A coil spring 24 surrounds the shank and the intermediate portion and is biased between the retainer 21 and the first annular shoulder 19. In this embodiment, the last few turns 25 of the coil spring are of a smaller diameter than the remainder of the turns and they are axially positioned between the second annular shoulder and the retainer.

A generally cylindrical receptacle 26, which has a uniform diameter outer surface 27, has a stepped diameter axial bore 28 of special configuration extending therethrough. One end portion 29 of the receptacle is shown flared outwardly, having been internally expanded to lock into an inwardly beveled annular portion 30 on the inside of the closure. The opposite extended end 31 of the receptacle has a cylindrical inlet opening portion 32 of a slightly larger diameter than the outside diameter of the split retainer in its uncompressed condition. Extending from the extended end 31 of the receptacle to a center portion 33 thereof is an inwardly beveled inner wall surface portion 34 which converges from a diameter adjacent the extended portion of the receptacle of greater than the diameter of the split retainer in its radially uncompressed condition (i.e. the cylindrical portion 32) to a diameter less than the diameter of the split ring in its uncompressed condition. An annular groove 35 has a larger diameter than the smallest diameter of the inwardly beveled inner wall and larger than a flattened annular portion 36 which is formed between the annular groove and the smallest diameter of the inwardly beveled surface and substantially terminates the inwardly beveled surface 34 at the center portion 33 of the receptacle.

As shown in FIGS. 2 and 3, in assembly the threaded portion 16 enters the female threaded portion 37 of the container and as the screw member is threaded home, the spring 24 compresses axially with the last few turns 25 of the spring positioned between the second annular shoulder 20 and the split retainer 21 and thus forms a positive contact therebetween. Continued axial advance of the screw member causes the split retainer 21 to compress radially as it slides down the inwardly beveled wall surface 34 to a flattened annular portion 36 which has the same diameter as the smallest diameter of the inwardly beveled surface, where the ring is maintained in its smallest compressed condition and slides therealong until it snaps into the groove as it expands to a slightly larger diameter and is permanently locked into the receptacle against any further axial displacement. In this embodiment the combined axial length of the intermediate portion 18 and the thickness of the last few turns 25 of the spring exceeded the axial length from the extended end 31 to the annular groove 35 so that the ring 21 would be displaced fully into the groove. It is to be noted that the intermediate portion 18 itself is dimensioned to provide the required axial displacement in the event a spring not having the last few turns spiralling to a smaller diameter were used.

Once the retainer 21 is snapped into the groove 35, upon unthreading the screw member from the container 12, the spring will project the head 17 out of the receptacle 26 but the screw member will not become separated from the receptacle.

Figure 6:
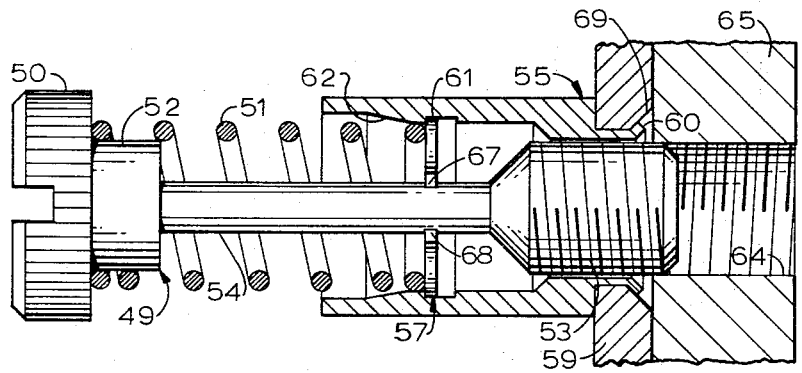
FIG. 6 is an elevational view of the embodiment of FIG. 5 shown as it is being used to connect a closure to an associated container.

Referring now to FIGS. 5 and 6, a second embodiment is shown. Here, screw member 49 also has a knurled head 50 an intermediate portion 52 adjacent to the head portion, an elongated shank portion 54 and a threaded end portion 53, all having respective diameter dimensions as described with reference to the first embodiment. The diameter of shoulder portion 52 is made substantially equal to the inner diameter of spring 51 so that the spring is centered thereon. C shaped retainer ring 57 which is fabricated of a resilient hard metal is snapped onto shank 54 so that it is permanently retained thereon. The inner diameter of retainer ring 57 and the dimensions of the portion thereof forming the split are chosen so that while the retainer ring is permanently held on shank 54, it is loosely held thereon, the inside diameter of the ring being slightly larger than the diameter of the shank. The oppositely facing sides 67 and 68 which form the split end ring 57 converge inwardly. The space between the outer edges of sides 67 and 68 is greater than the diameter of shank 54, while the space between the inner edges thereof is less than the diameter of the shank. This facilitates the joining of the ring to the screw member in a substantially permanent fashion.

Receptacle 55 has an end portion 60 of reduced diameter which is fixedly attached to closure 59 which may be a panel. Such attachment is achieved by swaging or flaring the ends of receptacle portion 60 to provide a mating joinder with beveled portions 69 of closure member 59. The receptacle member 55 has an undercut portion forming an annular groove 61 therein. At the entrance to receptacle member 55 is a flared portion 62.

Screw member 49 is attached to receptacle member 55 in a permanent holding fit therewith by snapping retainer ring 57 into undercut portion 61. This can be achieved either by lightly driving the screw head with a hammer, with the shank of the screw inserted into the receptacle or by driving the screw into threadable engagement with mating receptacle 64 in container 65 (as shown in FIG. 6). In view of the play between retainer ring 57 and shank 54, the retainer which is made of resilient metal, will readily be compressed inwardly as it rides along beveled portion 62 and will finally move into undercut portion 61 where it snaps back to its original dimension, thereby providing permanent retention of the screw within the receptacle. Spring 51 urges head 50 of screw 49 out from receptacle 55 when threaded portion 53 has been released from the mating threaded portion 64 in container 65.

In this embodiment, positive contact is achieved between a first annular shoulder defined by the difference in diameter between the intermediate portion and the head, and the split retainer by the axial length of the spring in its axially compressed condition, which exceeds the axial length of receptacle from its extended end to the annular groove 61.

The device of the invention thus provides simple yet highly efficient means for captivating a screw member in an associated receptacle. A highly durable retainer ring is utilized which is easy to assemble and install and which lends itself to inter-changeability of parts.

We claim:
1. A screw fastener permanently mounted in an assembled relation on a closure for fastening said closure to a container comprising
   (a) an elongated screw member having a centrally located shank portion,
   (b) a threaded end portion on one end of said screw member of a larger diameter than said shank for threading into a container,
   (c) a head portion on the end of said shank opposite to said threaded end portion and having a larger diameter than said shank,
   (d) an intermediate portion of smaller diameter than said head portion but of larger diameter than said shank portion positioned between said head portion and said shank portion to define a first annular shoulder between said head portion and the intermediate portion and a second annular shoulder be- tween the intermediate end portion and the shank,
(e) a smooth bore resilient split ring retainer member snapped over and slidably mounted on the shank of the screw member,
(f) spring means surrounding said shank and biased between said retainer member and the first annular shoulder portion,
(g) a generally cylindrical receptacle member having an axial bore extending therethrough with means at one end portion thereof for attachment to the closure and the opposite extended end portion thereof having at the inlet opening a cylindrical portion of a depth greater than the thickness of the split ring and of a diameter greater than the outer diameter of the split ring in its radially uncompressed condition,
(h) an inwardly beveled inner wall surface portion of the cylindrical member converging from the cylindrical portion, to a diameter less than the outside diameter of the split ring in its uncompressed condition at a center portion of the receptacle,
(i) an annular groove of a diameter at least equal to the outside diameter of the split ring in its radially uncompressed condition and of a depth at least equal to the thickness of the split ring, said groove terminating the inwardly beveled surface portion to define a third annular shoulder between the inwardly beveled surface portion and the annular groove,
(j) a second cylindrical portion of a diameter less than the diameter of the split ring at its radially uncompressed condition immediately adjacent to the annular groove to define an annular seat between the annular groove and the second cylindrical portion, and
(k) said spring means and the intermediate portion of the elongated screw portion forming combined driving means having an axial length exceeding the axial length from the third annular shoulder to the inlet opening of the receptacle member, but not exceeding the axial length from the seat to the inlet opening of the receptacle, so that in assembly the driving means will axially and positively contact the split ring member to axially advance and radially inwardly compress the split ring member as it moves along the inwardly beveled wall surface portion until it is advanced to the annular groove of the receptacle where it radially expands into the groove and is permanently retained by the third shoulder and the seat to prevent disassembly of the screw member from the receptacle member without rupture of the parts.

2. A captive screw fastener according to claim 1 wherein the axial length of said driving means is comprised of the intermediate portion and at least one convolution of said spring means positioned between the second annular shoulder and the split retainer member.

3. A captive screw fastener according to claim 1 wherein the axial length of said driving means is comprised of the intermediate portion.

4. A captive screw fastener according to claim 1 wherein the axial length of said driving means is comprised of the axially compressed spring.

References Cited
UNITED STATES PATENTS

| | | | |
|---|---|---|---|
| 2,326,792 | 8/1943 | Miller | 339—55 |
| 2,916,723 | 12/1959 | Cronin | 339—255 |
| 3,059,736 | 10/1962 | Boyd | 151—69 |
| 3,138,188 | 6/1964 | Tuozzo et al. | 151—69 |
| 3,195,600 | 7/1965 | Middleton | 151—69 |
| 3,250,559 | 5/1966 | Sommerfeld | 151—69 |

CARL W. TOMLIN, *Primary Examiner.*

M. PARSONS, JR., *Assistant Examiner.*

UNITED STATES PATENT OFFICE
CERTIFICATE OF CORRECTION

Patent No. 3,343,581                         September 26, 1967

Elmer L. Martin et al.

It is hereby certified that error appears in the above numbered patent requiring correction and that the said Letters Patent should read as corrected below.

Column 1, line 58, after "shank" insert -- , and an intermediate portion of smaller diameter --; lines 58 and 59, strike out "portion to define a first annular smaller diameter"; line 61, for "porion" read -- portion --; column 3, line 8, for "tthe" read -- the --; column 4, line 15, for "end" read -- in --.

Signed and sealed this 3rd day of December 1968.

(SEAL)
Attest:

Edward M. Fletcher, Jr.                          EDWARD J. BRENNER

Attesting Officer                                 Commissioner of Patents